United States Patent

Lang

[11] Patent Number: 5,836,612
[45] Date of Patent: Nov. 17, 1998

[54] PASSENGER SIDE GAS BAG

[75] Inventor: Norbert Lang, Leinzell, Germany

[73] Assignee: TRW Occupant Restraint Systems GmbH, Alfdorf, Germany

[21] Appl. No.: 673,101

[22] Filed: Jul. 1, 1996

[30] Foreign Application Priority Data

Jul. 3, 1995 [DE] Germany .................. 295 10 775 U

[51] Int. Cl.⁶ .................................................. B60R 21/16
[52] U.S. Cl. ........................................ 280/743.1; 280/732
[58] Field of Search ............................ 280/743.1, 728.1, 280/732, 730.1, 743.2

[56] References Cited

U.S. PATENT DOCUMENTS

| | | | |
|---|---|---|---|
| 4,988,118 | 1/1991 | Good et al. | 280/743.1 |
| 5,205,583 | 4/1993 | Henseler et al. | 280/743.1 |
| 5,454,594 | 10/1995 | Krickl | 280/743.1 |
| 5,520,414 | 5/1996 | Bishop | 280/728.1 |

FOREIGN PATENT DOCUMENTS

| | | | |
|---|---|---|---|
| 0714813 | 6/1996 | European Pat. Off. | |
| 6-239191 | 8/1994 | Japan | 280/743.1 |
| 2263668 | 8/1993 | United Kingdom | 280/743.1 |
| 2289242 | 11/1995 | United Kingdom . | |

OTHER PUBLICATIONS

Japanese Abstract JP 6,270,756, Sep. 27, 1994.

*Primary Examiner*—Peter C. English
*Attorney, Agent, or Firm*—Tarolli, Sundheim, Covell, Tummino & Szabo

[57] ABSTRACT

A passenger side gas bag comprises an envelope part and two lateral parts connected therewith. The envelope part and the two lateral parts are formed from an integral blank (10) of flat textile fabric. The blank comprises an elongated middle section (12), corresponding to the envelope part, and two flaps (14*a*, 14*b*) corresponding to the lateral parts and joined to its middle portion. Each flap is sewn along its edge to the adjacent longitudinal edge of the middle section (12).

3 Claims, 1 Drawing Sheet

PASSENGER SIDE GAS BAG

TECHNICAL FIELD

The invention relates to a passenger side gas bag.

BACKGROUND OF THE INVENTION

According to conventional techniques such a gas bag is made up of three fabric parts which are sewn together along edges thereof. A substantial fraction of manufacturing operations is devoted to the cutting out of the three textile parts and the production of the seams for the connection of the textile parts. In the inflated state of the gas bag the seams are stressed particularly in the portion facing the passenger, since the forces occurring are predominantly directed athwart the seams. A further point is that manufacturing operations are made more involved because during the joining together of the fabric parts attention must be paid to the correct position and angular setting thereof.

BRIEF SUMMARY OF THE INVENTION

The invention provides a passenger side gas bag whose production is simplified and in which seams are avoided which would be stressed transversely during deployment. A passenger side gas bag in accordance with the invention comprises an envelope part and two lateral parts connected therewith. The envelope part and the lateral parts are formed from an integral blank of flat textile fabric. The blank comprises an elongated middle section, corresponding to the envelope part, and two flaps corresponding to the lateral parts and joined to its middle portion. Each flap is sewn along its edge to the adjacent longitudinal edge of the middle section. The gas bag is formed by a single fabric blank with the result that the effort required for cutting out is generally reduced. The side parts are forced to assume their correct angular alignment and be arranged in relation to the surrounding part so that there is no likelihood of incorrect assembly. In the portion facing the passenger in the course of deployment of the gas bag the envelope part and the lateral parts do not require any seam join which would be subject to high transverse stresses. Finally there is a substantial reduction in the amount of sewing operations and the amount of thread required is correspondingly reduced.

Further advantages and features of the invention will be understood from the dependent claims and the following detailed description of an advantageous embodiment in conjunction with the accompanying drawings.

DETAILED DESCRIPTION OF A PREFERRED EMBODIMENT

Figure 1:
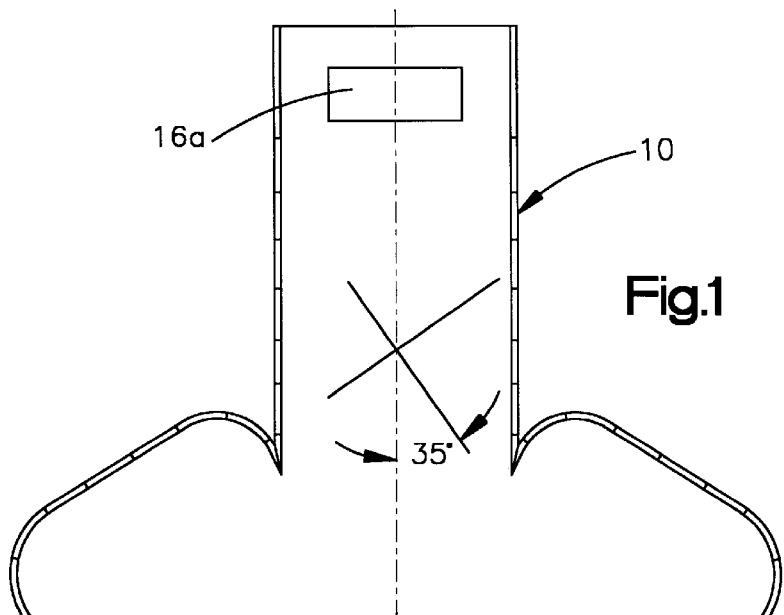
FIG. 1 shows a blank for the production of a gas bag.

For the production of a passenger side gas bag the blank 10 illustrated in FIG. 1 is manufactured from a flat textile fabric. This blank 10 comprises an elongated middle part 12 and two flaps 14a and 14b laterally joined in the middle part of this middle section 12. These flaps 14a and 14b possess the configuration of a right angled triangle with rounded apices. The edges of the flaps 14a and 14b and of the middle section 12 run together at an acute angle. As shown in FIG. 1, the middle section 12 has rectilinear edges which extend parallel to each other.

At the two ends of the elongated middle section 12 a rectangular cut-out 16a and 16b is respectively located. These cut-outs 16a and 16b constitute the inflation opening of the gas bag. The ends of the-middle section 12, in which the cut-outs 16a and 16b are arranged are superposed for the attachment of the gas bag on a housing 18 (FIG. 2) accommodating the gas generator. The apices of the flaps 14a and 14b abut the narrow sides of the inflation opening of the gas bag and make a contribution to the edge thereof. Owing to the selected angular alignment of the warp or weft threads at 35° to the longitudinal direction of the middle section 12 it is possible to ensure that the warp and weft threads are set at approximately 45° to the edge of the inflation opening in the apical portions of the flaps 14a and 14b with the result that there is a favorable distribution of stresses.

Figure 2:
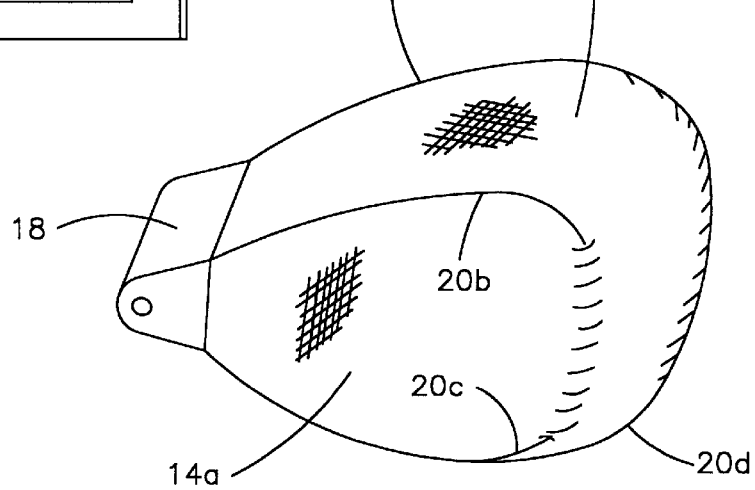
FIG. 2 shows a perspective elevation of the inflated gas bag.

As shown in FIG. 2 the middle section 12 and the flaps 14a and 14b are sewn along their adjacent edges with one another. The respective seams are referenced 20a, 20b, 20c and 20d in FIG. 2. The seams extend starting from the housing 18 as far as that part of the gas bag, which in the inflated condition faces the passenger. In this part facing the passenger no seams are present, unlike the case of conventional gas bag design.

What is claim is:

1. A passenger side gas bag comprising an envelope part and two lateral parts connected therewith, said envelope part and said lateral parts being formed from an integral blank of flat textile fabric, said blank having an elongated middle section, corresponding to said envelope part, and two flaps corresponding to said lateral parts and joined to a middle portion of said elongated middle section, each flap being sewn along an edge to an adjacent edge of said middle section, said flaps of said blank generally possessing the configuration of a right angled triangle with rounded apices, and said elongated middle section having rectilinear edges which extend parallel to each other.

2. The passenger side gas bag of claim 1, wherein said edges of said flaps and of said middle section run together at an acute angle.

3. The passenger side gas bag of claim 1, wherein the warp or weft threads of said textile fabric are inclined at approximately 35° to the longitudinal direction of said middle section.

* * * * *